(12) United States Patent
Holloway et al.

(10) Patent No.: US 7,530,779 B2
(45) Date of Patent: May 12, 2009

(54) CAM-LOCK MECHANISM FOR ATTACHMENT OF IMPLEMENTS TO PRIME MOVERS

(75) Inventors: Gale A. Holloway, New Lenox, IL (US); Madonna Holloway, legal representative, New Lenox, IL (US); Richard H. Justice, South Bend, IN (US)

(73) Assignee: CNH America LLC, New Holland, PA (US)

( * ) Notice: Subject to any disclaimer, the term of this patent is extended or adjusted under 35 U.S.C. 154(b) by 73 days.

(21) Appl. No.: 11/863,792

(22) Filed: Sep. 28, 2007

(65) Prior Publication Data

US 2009/0087292 A1    Apr. 2, 2009

(51) Int. Cl.
*E02F 3/627* (2006.01)

(52) U.S. Cl. .................. 414/686; 403/109.6; 403/374.4; 172/273

(58) Field of Classification Search .................. 414/686; 403/109.5, 109.6, 379.3, 379.4, 379.5; 172/272–275
See application file for complete search history.

(56) References Cited

U.S. PATENT DOCUMENTS

| | | |
|---|---|---|
| 3,545,626 A | 12/1970 | Seiz |
| 3,610,450 A | 10/1971 | Demkiw |
| 3,762,674 A | 10/1973 | Ortega |
| 3,805,422 A | 4/1974 | Stepe |
| 3,863,786 A | 2/1975 | Frank |
| 4,056,250 A | 11/1977 | Uchiyama |
| 4,133,121 A | 1/1979 | Hemphill |
| 4,208,162 A | 6/1980 | Neitzel |
| 4,283,157 A | 8/1981 | Kowalski |
| 4,295,287 A | 10/1981 | Natzke et al. |
| 4,345,870 A | 8/1982 | Anderson et al. |
| 4,383,793 A | 5/1983 | Weir |
| 4,498,839 A * | 2/1985 | Williams et al. ............ 414/686 |
| 4,780,046 A | 10/1988 | Friesen et al. |
| 4,813,163 A | 3/1989 | Livingston et al. |
| 4,836,741 A | 6/1989 | St. Louis et al. |
| 5,135,347 A | 8/1992 | Kaczmarczyk et al. |
| 5,405,237 A | 4/1995 | Oka |
| 5,540,289 A | 7/1996 | Hirooka et al. |
| 5,927,665 A | 7/1999 | Grabnic |
| 6,142,435 A | 11/2000 | Lodi |
| 6,234,710 B1 | 5/2001 | Ananiev |
| 6,386,821 B1 | 5/2002 | Schneider |

FOREIGN PATENT DOCUMENTS

GB            2 131 391 A    *    6/1984

* cited by examiner

*Primary Examiner*—Donald Underwood
(74) *Attorney, Agent, or Firm*—Patrick M. Sheldrake; John William Stader; Michael G. Harms

(57) ABSTRACT

A cam lock device for replacing the conventional pins connecting a loader mechanism to a prime mover, the device in conjunction with a modified loader mounting bracket, provides an adjustable, easily installable and removable apparatus that allows secure and convenient attachment/detachment of a loader mechanism to a prime mover.

14 Claims, 3 Drawing Sheets

CAM-LOCK MECHANISM FOR ATTACHMENT OF IMPLEMENTS TO PRIME MOVERS

BACKGROUND OF THE INVENTION

The present invention relates to construction and agricultural implements attached to prime movers and, more specifically, to a mounting mechanism that allows for easy attachment and detachment of a hydraulic power loader to a prime mover.

It is common for prime movers (tractors) to carry loaders to which a variety of attachments can be connected for a wide range of material handling applications in the industrial, agricultural and construction fields. Such loaders, usually mounted on the front end of a tractor, generally include a frame assembly, boom arms pivotally mounted on the frame, an attachment mounted across the forward ends of the boom arms, hydraulic tilt cylinders coupled between the attachment and the boom arms, and hydraulic lift cylinders coupled between the boom arms and the frame assembly.

Regardless of the application, in many instances it is desirable for front loaders to be removable because, even though other implements can be used while the loader is attached to the front end, handling and maneuverability of the tractor are usually enhanced with the loader removed. Thus, it is imperative for a tractor to readily convert between a material-handling vehicle with a front loader to a vehicle with an implement operative via another mounting device, such as a three point hitch connected mower.

Loaders are typically connected to the tractor using removable pins that connect a tower structure of the loader mechanism to a mounting structure on the tractor. After a period of time and use, removal of the connecting pins becomes difficult due to corrosion and contamination thereby increasing the difficulty of removing or attaching the loader to the tractor.

It would be a great advantage to provide a locking device to replace the connecting pins in a loader mount that would not be susceptible to the effects of contamination and corrosion and therefore would permit easier removal and installation of a loader on a tractor to overcome the above problems and disadvantages.

SUMMARY OF THE INVENTION

Accordingly, it is an object of the present invention to provide a cam lock device that replaces conventional loader attachment pins and permits easy removal and installation of loader arm mechanisms on prime movers.

It is another object of the present invention to provide a cam lock device for securely connecting a loader to a prime mover and prevents relative movement between the loader mechanism and the mount structure on the prime mover.

It is a further object of the present invention to provide a cam lock device for securing a loader mechanism to a prime mover that remains easily operative when contaminated by dirt and/or corrosion.

It is a further object of the present invention to provide a cam lock device for securing a loader mechanism to a prime mover that is adjustable to accommodate slight production configuration variations between attachment structures and loader tower structures.

It is a further object of the present invention to provide a cam lock device for connecting a loader mechanism to a prime mover that can be installed and adjusted by hand without the need for special tools.

It is a still further object of the present invention to provide a cam lock device for connecting a loader mechanism that, once installed, remains securely in place and until the device is selectively removed.

It is a still further object of the present invention to provide a cam lock device that is compatible with the connection structure on a loader mechanism and on the prime mover to which it is to be connected thereby allowing the device to be used without modification of the loader mechanism or the prime mover.

It is a still further object of the present invention to provide a cam lock device for connecting a loader mechanism to a prime mover that is durable in construction, inexpensive of manufacture, carefree of maintenance, easily assembled, and simple and effective to use.

These and other objects will appear more fully hereinafter from a consideration of the detailed description which follows, in conjunction with the accompanying sheets of drawings wherein one principal embodiment of a cam lock device for replacing the conventional pins connecting a loader mechanism to a prime mover, the device in conjunction with a modified loader mounting bracket, provides an adjustable, easily installable and removable apparatus that allows secure and convenient attachment/detachment of a loader mechanism to a prime mover is presented by way of example.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
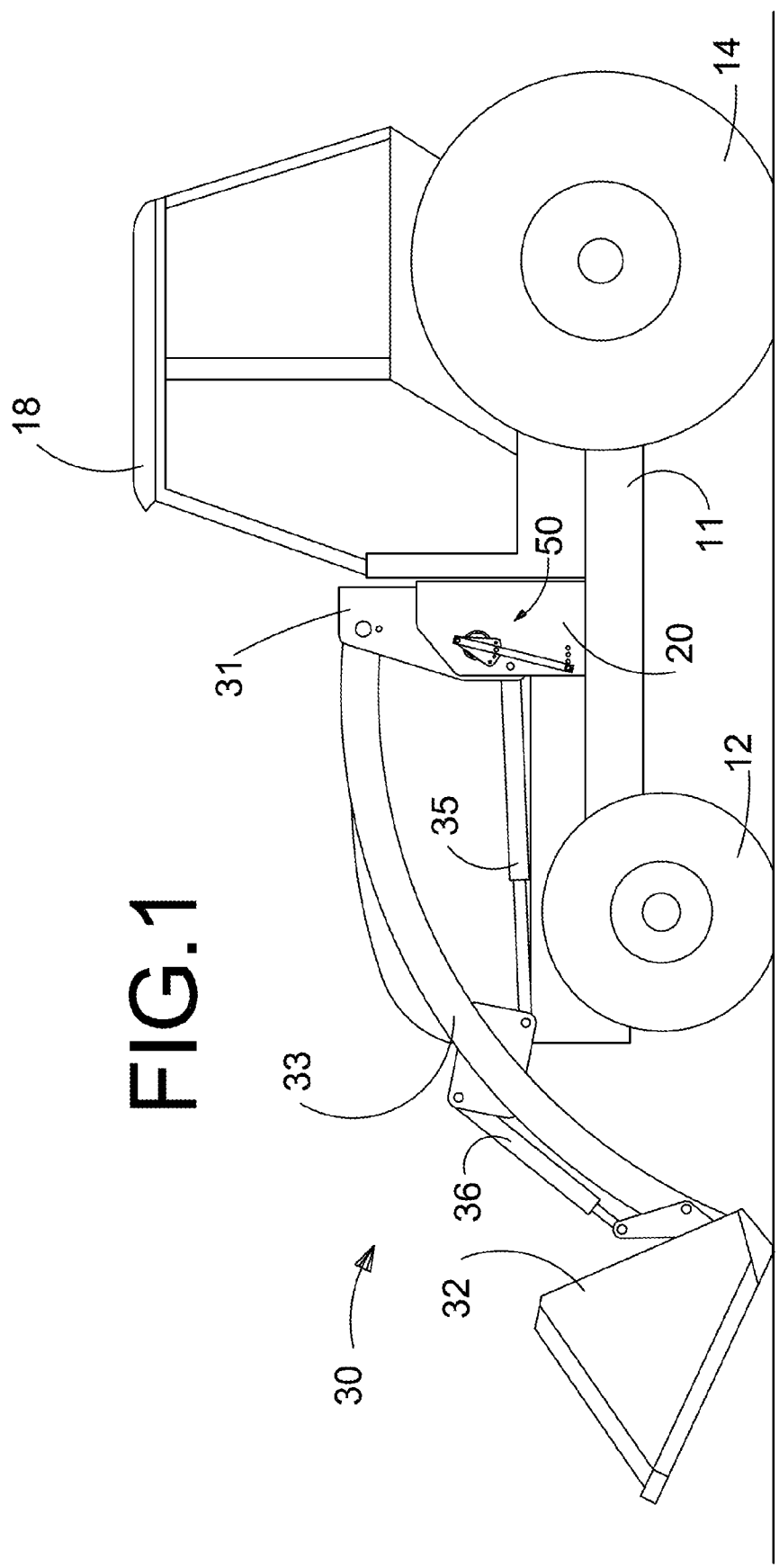
FIG. 1 is a partial left side elevation view of a tractor having an attached loader mechanism featuring a mounting mechanism of the type on which the instant invention is useful.

FIG. 1 shows an exemplary tractor to which the instant invention may be incorporated. Generally, tractor 10 has a longitudinal axis (not shown) extending through the tractor in a direction corresponding to a line defined generally by the direction of movement of the tractor. A generally longitudinal main frame 11 supported by wheel pairs 12, 14 may be incorporated as a primary structural element of tractor 10 and to which many of the tractor components are attached. Alternatively, the rear axle and transmission assembly could fill the need for primarily structural strength and as the support for other tractor components, such as an engine 16 and cab 18. Of course, one of skill in the art will understand that other structural arrangements are possible and in use.

Loader 30 is shown mounted to tractor 10 and extending forwardly to perform material handling operations at the front end of tractor 10. Loader 30 comprises a frame 31, also referred to herein as a tower for connecting the loader 30 to tractor 10, generally a pair of boom arms 33 pivotally mounted on the tower structure 31, and an attachment of any suitable type 32 (a bucket shown as one example) mounted across the forward ends of the boom arms 33. Hydraulic tilt cylinders 36 coupled between the attachment and the boom arms, and hydraulic lift cylinders 35 coupled between the boom arms and the frame assembly enable the attachment to be selectively positioned thereby enabling material handling operations to be performed.

For purposes of clarity, it should be appreciated that the loader attachment structure, hereinafter referred to as mounting bracket 20, on which the instant invention is used, will be described and shown as a left-hand bracket for use with a forward-mounted loader. In most cases, two mounting brackets will be required, one on each side of the tractor, to support a pair of loader mounting towers for the loader. The left and right-hand mounting brackets, while similar, are in reality mirror images of each other. Reference to forward and rearward, relative to the tractor longitudinal axis, will be reversed for rear-mounted loaders.

As the capability to detach the loader from tractor is desirable, the connection between tower 31 and mounting bracket 20 is designed for selective detachment. When the loader 30 is attached, the connection between tower 31 and mounting bracket 20 must provide sufficient stability to prevent significant relative movement between the tower 31 and the mounting bracket 20. The connection must also be easy to operate such that removal of the loader can be accomplished by a single vehicle operator, preferably by hand. A primary element in this connection is cam lock device 50.

Figure 2:
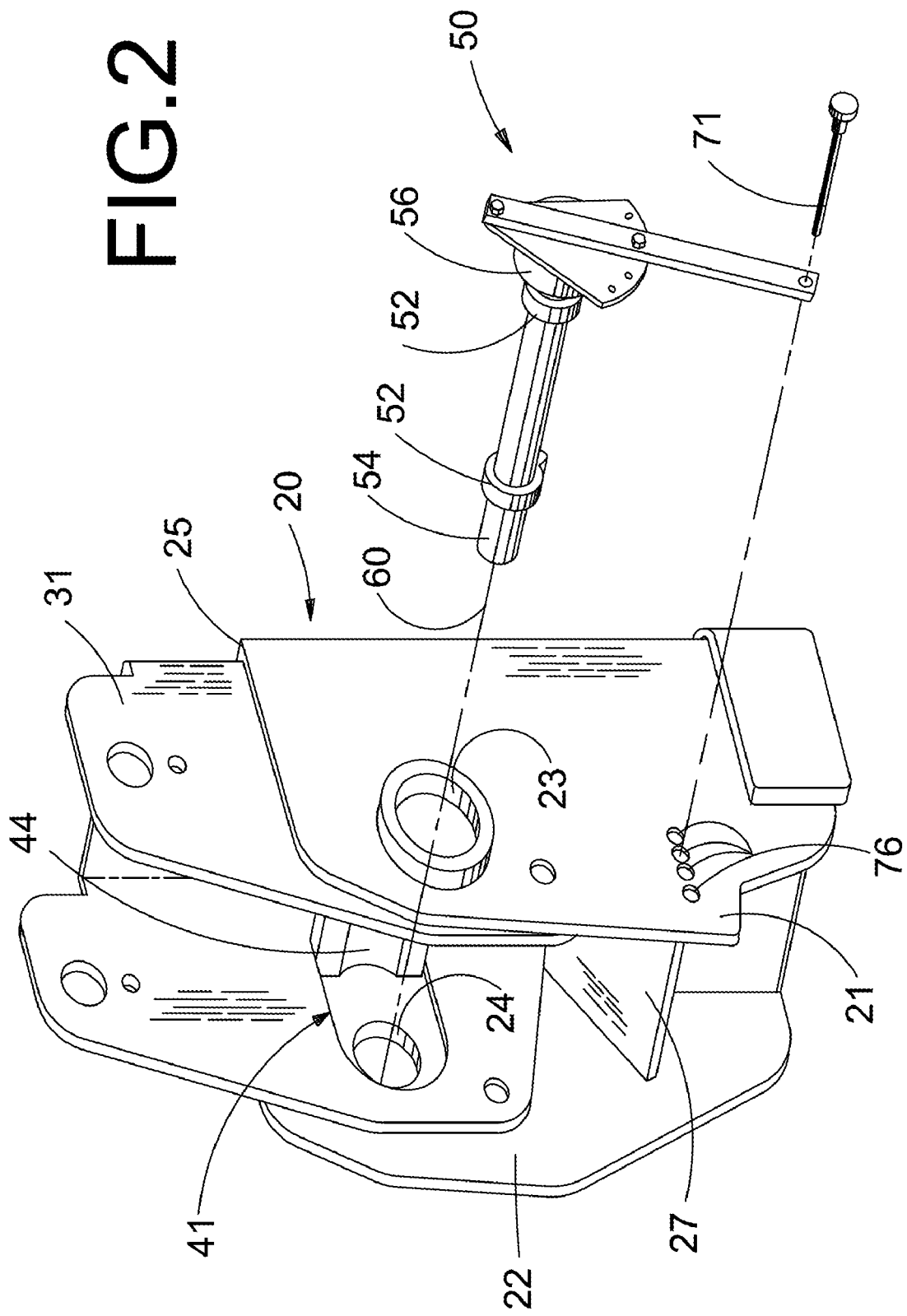
FIG. 2 is a partial perspective view of a loader tower structure and a tractor mounting bracket showing the cam-lock device of the instant invention.

Referring now to FIG. 2 where there is shown a portion of tower structure 31 engaged with mounting bracket 20. Tower structure 31 includes a pair of elongate openings 41 (only one shown), one in each side plate of the mounting tower frame. Elongate openings 41 are aligned, when the loader is positioned for connection to the tractor, with first and second openings 23, 24 in mounting bracket 20 along connection axis 60. Tower 31 also includes a bearing surface 44 perpendicularly oriented with respect to elongate openings 41 and adjacent to one end of the openings 41. Bearing surface 44 is offset from connection axis 60 in the rearward direction (toward base 25). As would be apparent to one skilled in the art, the direction of offset of the bearing surface from the connection axis determines the general clamping direction of the present invention; the present invention may be oriented in any direction and provide clamping engagement between two members.

Mounting bracket 20 comprises first 21 and second 22 sides connected by a base 25 wherein the sides are arranged to form a generally channel-shaped member. As mounted on the tractor, first and second sides 21, 22 extend forwardly with respect to the tractor for receiving the tower 31 on a loader by forward motion of tractor 10. Bracket 20 also comprises lower guide structure 27 for positioning tower structure 31 in the desired vertical position for attachment of the loader. Guide structure 27 may be angled with respect to horizontal and oriented in bracket 20 so that as the tractor approaches a detached loader, the guide structure 27 will engage a portion of tower 31 and guide the tower into a position for attachment. First side 21 further comprises a first bearing opening 23 while second side 22 comprises second bearing opening 24, both bearing openings being arranged on connection axis 60. First bearing opening 23 is larger in diameter than second bearing opening 24, sufficiently so to allow cam lock device 50 to be inserted therethrough.

Figure 3:
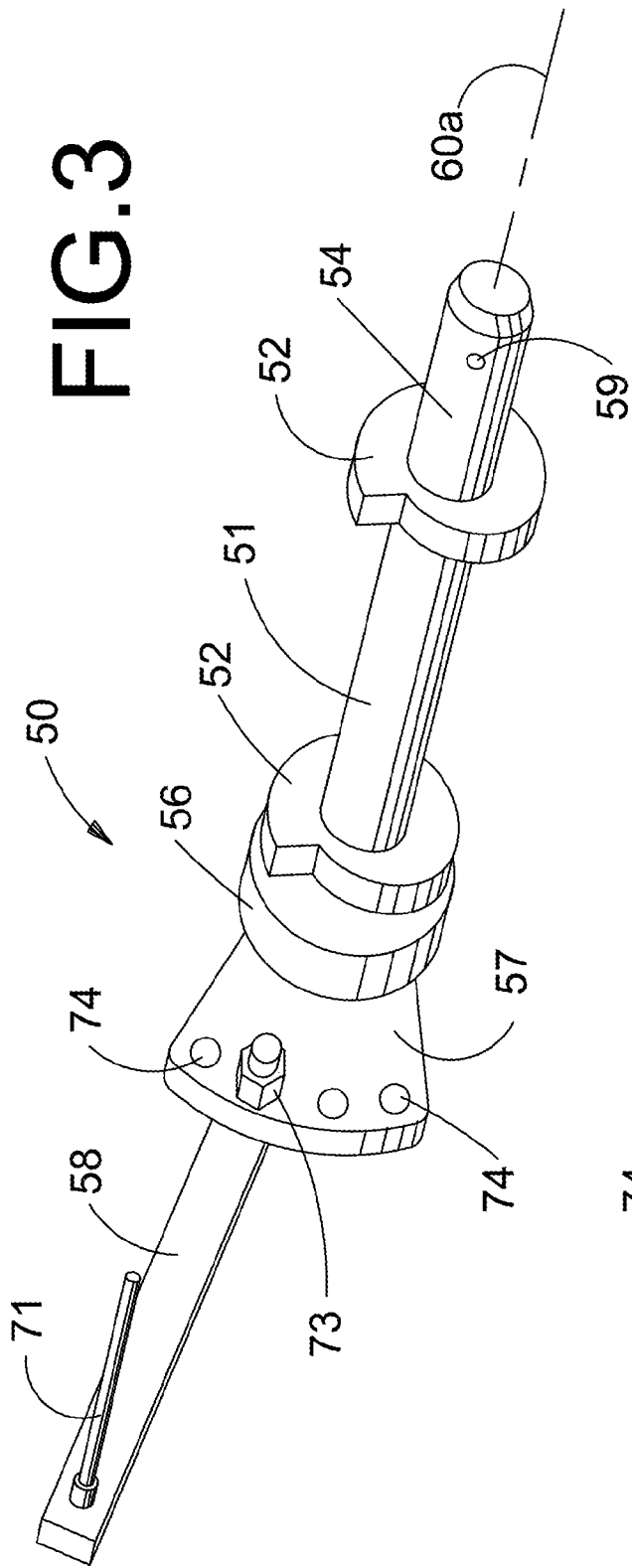
FIG. 3 is a perspective view of the cam-lock device.
Figure 4:
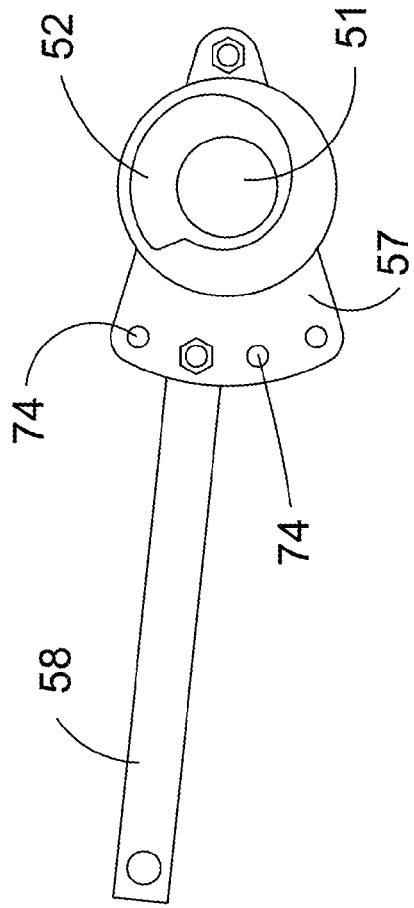
FIG. 4 is an end view of the cam-lock device showing the cam profiles.

Now referring to FIGS. 2-4, cam lock device 50 is an elongate device that replaces a conventional loader connection pin which is known in the prior art for connecting loaders to tractors. Cam lock device 50 comprises an elongate shaft 51 having a central axis 60a, which, when installed, corresponds to the connection axis 60. Cam lock device 50 further comprises at least one cam 52, a first bearing 56, a second bearing 54, an actuator arm 58, and a retainer 71. First bearing 56 is sized to match first bearing opening 23. Second bearing 54 has a diameter sized to match second bearing opening 24; second bearing 54 may be merely an extension of shaft 51.

Use of the present invention to couple a loader and a tractor is presented to describe interaction between the above-described members to enable the invention as a whole. Starting with loader detached from the tractor, the tractor is moved to align lower portions of tower 31 with the channel structure of brackets 20. Forward movement of the tractor from the initial point of engagement causes the tower structure to be further engaged in the support bracket channel until guide structure 27 begins to interact with a portion of the tower 31. The interaction between the tower 31 and guide structure 27 vertically positions and aligns elongate openings 41 generally on connection axis 60. The size of the elongate openings 41, especially on the minor axis of the openings, determines the permissible misalignment between the elongate openings and the connection axis which will still allow the loader attachment to be accomplished. The major axis opening establishes the extent of permissible engagement movement that may be accomplished once cam lock device is inserted into the mounting bracket.

When the tower 31 is near-fully engaged in the channel structure of mounting bracket 20, cam lock device 50 is inserted along connection axis 60 where it engages first and second bearing openings 23, 24 thereby positioning cam 52 generally between first and second sides 21, 22 and adjacent to bearing surface 44. Cam lock device 50 is then rotated in a first direction, using actuator arm 58, which brings the profiled surface of the periphery of cam 52 into contact with bearing surface 44. Further rotation of the cam lock device 50 in the first direction applies a force acting between the cam and the bearing surface which urges the tower into full engagement with the mounting bracket 20. Full engagement is achieved when the rearward surface of tower 31 is in contact with the inner surface of base 25 and can move no further in the engaging direction. Cam lock device 50 is then secured in its rotational position using retainer 71 which engages an end of actuator arm 58 distal from the rotational axis 60a and an adjustment opening 76 provided on first side 21. Additional adjustment positions are provided by flange 57 which is connected adjacent to actuator arm 58 and enables the position of actuator arm 58 to be varied with respect to the rotational alignment of cam 52. As illustrated in FIGS. 2-4, the four adjustment openings 76 provided in side plate 21 combined with four arm adjustment openings 74 provided in flange 57 and secured by fastener 73, provide a total of 16 possible rotational positions in which cam 52 may be secured with respect to the bearing surface 44.

Axial movement of cam lock device 50 is provided by installing a retainer mechanism, such as a snap pin, lynch pin, or the like, in pin hole 59. When cam lock device 50 is fully inserted into first and second bearing openings 24, 25, pin hole 59 is positioned outboard of second side 22. Insertion of a retention device through pin hole 59 limits axial movement of the device and prevents the cam lock device 50 from being removed or unintentionally displaced from the mounting bracket 20. Similarly, retainer 71 may also be secured to prevent unintentional displacement from an engaged position using snap pins or other functionally equivalent means to prevent or limit axial motion.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. An apparatus for selectively securing a loader mechanism to a mounting bracket on a prime mover, the loader mechanism having an attached position and a detached position, the mounting bracket having a generally C-shaped channel portion for receiving a mounting tower on the loader mechanism, the channel portion having generally parallel and opposing first and second legs connected by a base, the tower having two opposing generally planar surfaces for engagement with the channel portion, engagement positioning the planar surfaces between the first and second legs, the apparatus comprising:

first and second openings in the first and second legs respectively, said first and second openings aligned on a pivotal axis;

at least one elongate opening in the tower, a plane of said at least one elongate opening, when the loader mechanism is the attached position, being disposed generally perpendicular to said pivotal axis;

at least one bearing pad on the tower, said bearing pad perpendicularly oriented with respect to at least one elongate opening; and a cam lock device, said cam lock device further including:
        an elongate shaft, said shaft having a first bearing portion and a second portion;
        an actuator arm connected to one end of said shaft for selective rotation of said shaft in opposing first and second directions; and
        at least one cam connected to said shaft for rotation by said shaft, whereby said cam, when aligned along said pivotal axis and disposed between the opposing surfaces of the tower, being selectively rotated by rotation of said shaft in said first direction, thereby contacts said bearing pad and urges engagement of the tower into the mounting bracket from the detached position to the attached position.

2. The apparatus of claim 1, wherein rotation of said shaft in said second direction releases engagement of the tower from the mounting bracket and enables tower movement from the attached position to the detached position.

3. The apparatus of claim 2, further comprising a retainer for selectively engaging with said cam lock device to prevent rotation.

4. The apparatus of claim 3, wherein said retainer simultaneously engages said actuator arm and the mounting bracket.

5. The apparatus of claim 4, further comprising at least one adjustment opening in the mounting bracket for receiving said retainer.

6. The apparatus of claim 2, wherein said actuator arm is pivotable with respect to said shaft and may be fixed with respect to said shaft at one of a plurality of pre-selected positions.

7. The apparatus of claim 5, wherein said actuator arm is pivotable with respect to said shaft and may be fixed with respect to said shaft at one of a plurality of pre-selected positions.

8. The apparatus of claim 1, wherein said first opening and said elongate opening are sized to allow axial insertion of said cam lock device from one direction.

9. In a tractor having a removable loader mechanism secured to a mounting bracket on the tractor, the loader mechanism having an attached position and a detached position, the mounting bracket having at least one generally C-shaped channel portion for receiving therein a respective portion of a mounting tower on the loader mechanism, the channel portion having generally parallel and opposing first and second legs connected by a base, the mounting tower having two opposing generally planar surfaces for engagement with the channel portion, engagement positioning the planar surfaces between the first and second legs, the improvement comprising:

first and second openings in the first and second legs, respectively, said first and second openings aligned on a pivotal axis;

an elongate opening in each said planar surface of the tower, a plane of said elongate openings, when the loader mechanism is the attached position, being generally perpendicular to said pivotal axis;

at least one bearing pad on the tower, said bearing pad perpendicularly oriented with respect to at least one elongate opening;

a cam lock device, said cam lock device further including:
        an elongate shaft, said shaft having a first bearing portion and a second bearing portion, said first bearing portion for coaxial engagement with said first opening, said second bearing surface for coaxial engagement with said second opening;
        an actuator arm connected to one end of said shaft for selective rotation of said shaft in opposing first and second directions; and
    at least one cam connected to said shaft for rotation by said shaft, whereby said cam, when aligned along said pivotal axis and disposed between the opposing surfaces of the tower, being selectively rotated by rotation of said shaft in said first direction, thereby contacts said bearing pad and urges engagement of the tower into the mounting bracket, moving the loader from the detached position to the attached position, and wherein rotation of said shaft in said second direction releases engagement of the tower from the mounting bracket allowing the loader to move from the attached position to the detached position.

10. The improvement of claim 9, further comprising a retainer for selective engagement with said cam lock device to prevent rotation.

11. The improvement of claim 10, further comprising a plurality of adjustment openings in the mounting bracket for receiving said retainer.

12. The improvement of claim 10, wherein said actuator arm is pivotable with respect to said shaft and may be fixed with respect to said shaft at one of a plurality of pre-selected positions.

13. The improvement of claim 9, wherein said first opening and said elongate opening are sized to allow axial insertion of said cam lock device from a direction approaching said first side.

14. A method for attaching a loader to a tractor, comprising the steps:
   providing a loader mechanism having at least one mounting tower, each at least one mounting tower having two opposing generally planar surfaces;
   providing at least one mounting bracket on the tractor, the mounting bracket having a generally C-shaped channel portion for receiving therein a respective portion of one of the at least one tower on the loader mechanism, the channel portion having generally parallel and opposing first and second legs connected by a base;
   providing first and second openings in the first and second legs, respectively, said first and second openings aligned on a rotational axis;
   providing an elongate opening in each planar surface of the mounting tower, the elongate openings, when the loader mechanism is an attached position, being disposed generally on the pivotal axis;
   providing at least one bearing pad on the tower, the bearing pad being perpendicularly oriented with respect to the elongate openings;
   providing a cam lock device, the cam lock device further comprising;
      an elongate shaft, the shaft having a first bearing portion and a second bearing portion, the first bearing portion for coaxial engagement with the first opening, the second bearing surface for coaxial engagement with the second opening;
      an actuator arm connected to one end of the shaft for selective rotation of the shaft in opposing first and second directions; and
   at least one cam connected to the shaft for rotation by the shaft;
   providing a retainer for selectively engaging the cam lock device to prevent rotation;
   positioning the mounting bracket adjacent to the tower by operation of the tractor;
   urging the tower into concentric engagement with the mounting bracket by movement of the tractor;
   inserting the cam lock device into the first opening of the mounting bracket by movement parallel to the rotational axis;
   continuing axial insertion of the cam lock device, engaging the elongate openings in the tower and the second opening in the mounting bracket;
   rotating the shaft in a first direction, thereby causing the cam to contact the bearing pad;
   continuing rotation of the shaft in the first direction to urge engagement of the tower into the mounting bracket, moving from a detached position until the mounting tower is securely engaged in the mounting bracket thereby achieving an attached position; and
   securing the shaft with the retainer to maintain the mounting tower in the attached position with respect to the mounting bracket.

* * * * *